*(12)* United States Patent
Osgood et al.

(10) Patent No.: US 11,053,814 B2
(45) Date of Patent: Jul. 6, 2021

(54) TURBINE ENGINE COMPONENT AND METHOD OF COOLING

(71) Applicant: GENERAL ELECTRIC COMPANY, Schenectady, NY (US)

(72) Inventors: Daniel Endecott Osgood, Cincinnati, OH (US); Jonathan Russell Ratzlaff, Loveland, OH (US); Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 16/356,390

(22) Filed: Mar. 18, 2019

(65) Prior Publication Data

US 2020/0300114 A1    Sep. 24, 2020

(51) Int. Cl.
 *F01D 9/06*   (2006.01)
 *F01D 25/12*  (2006.01)
 *F01D 25/32*  (2006.01)

(52) U.S. Cl.
 CPC .............. *F01D 25/12* (2013.01); *F01D 9/065* (2013.01); *F01D 25/32* (2013.01); *F05D 2220/32* (2013.01); *F05D 2260/221* (2013.01)

(58) Field of Classification Search
 None
 See application file for complete search history.

(56) References Cited

U.S. PATENT DOCUMENTS

| | | | | |
|---|---|---|---|---|
| 4,014,674 A | * | 3/1977 | Kirillov | F01D 25/32 62/619 |
| 4,938,785 A | * | 7/1990 | MacPherson, Jr. | B01D 45/16 55/439 |
| 5,497,613 A | * | 3/1996 | McGuigan | F01D 9/02 60/39.37 |
| 5,558,496 A | * | 9/1996 | Woodmansee | F01D 5/085 415/115 |
| 5,853,440 A | | 12/1998 | Dyson | |
| 5,893,936 A | | 4/1999 | Dyson | |
| 7,922,794 B2 | | 4/2011 | Morphey | |
| 8,997,310 B2 | | 4/2015 | Davidshofer et al. | |
| 9,132,372 B2 | | 9/2015 | Zecchi et al. | |
| 9,339,749 B2 | | 5/2016 | Thompson et al. | |
| 9,945,388 B2 | | 4/2018 | Palomba et al. | |
| 2004/0221720 A1 | * | 11/2004 | Anderson | F01D 25/32 95/272 |
| 2011/0067409 A1 | | 3/2011 | Beeck | |
| 2016/0123227 A1 | | 5/2016 | Murray et al. | |
| 2017/0370287 A1 | | 12/2017 | Perason et al. | |
| 2018/0021711 A1 | | 1/2018 | Mook et al. | |
| 2018/0023473 A1 | | 1/2018 | Manteiga et al. | |

(Continued)

FOREIGN PATENT DOCUMENTS

| | | | | |
|---|---|---|---|---|
| DE | 19834376 A1 | * | 2/2000 | ............ F01D 5/187 |
| EP | 2156941 A1 | | 2/2010 | |
| JP | 09324605 A | * | 12/1997 | ............ F01D 5/187 |

*Primary Examiner* — Woody A Lee, Jr.
(74) *Attorney, Agent, or Firm* — McGarry Bair PC

(57) ABSTRACT

A component for a turbine engine includes a body having an outer surface confronting a combustion air flow path and defining an interior, as well as a first cooling passage having at least a portion supplying cooling air to the interior of the body. The component also includes a cyclone separator having a cooling air inlet, a clean air outlet, and a dirty air outlet.

16 Claims, 10 Drawing Sheets

(56) References Cited

U.S. PATENT DOCUMENTS

| | | |
|---|---|---|
| 2018/0023595 A1 | 1/2018 | Mook et al. |
| 2018/0169669 A1 | 6/2018 | Himmelmann |
| 2018/0229167 A1* | 8/2018 | Rambo .................. F01D 25/32 |

* cited by examiner

TURBINE ENGINE COMPONENT AND METHOD OF COOLING

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to improve engine efficiency. It is beneficial to provide cooling measures for components such as airfoils in the high-temperature environment, where such cooling measures can reduce material wear on these components and provide for increased structural stability during engine operation.

The cooling measures can include bleed air from the compressor that is routed to the desired location in the engine. The bleed air can be utilized to provide purge air flow at specific component interfaces. Optimizing bleed air delivery and coverage further helps to improve the engine efficiency.

BRIEF DESCRIPTION

In one aspect, the disclosure relates to a component for a turbine engine including a body having an outer surface confronting a combustion air flow path and defining an interior, a first cooling passage having at least a portion supplying cooling air to the interior of the body, a second cooling passage having at least a portion supplying cooling air to the interior of the body and fluidly separated from the first cooling passage, a scavenge passage fluidly separated from the second cooling passage, and a first cyclone separator having a cooling air inlet, a clean air outlet fluidly coupled to the first cooling passage, and a dirty air outlet fluidly coupled to the scavenge passage.

In another aspect, the disclosure relates to a component for a turbine engine including an airfoil body with an outer wall bounding an interior and extending axially between a leading edge and a trailing edge to define a chord-wise direction, and also extending between a root and a tip to define a span-wise direction, a first cooling passage having at least a portion supplying cooling air to the interior of the airfoil body, a second cooling passage having at least a portion supplying cooling air to the interior of the airfoil body and fluidly separated from the first cooling passage, a scavenge passage, and a cyclone separator having a cooling air inlet, a clean air outlet fluidly coupled to the second cooling passage, and a dirty air outlet fluidly coupled to the scavenge passage.

In yet another aspect, the disclosure relates to a method of cooling a component in a turbine engine. The method includes flowing a supply of cooling air to the component, directing a first portion of the supply of cooling air to a cyclone separator located within the component to clean the first portion of the supply of cooling air, flowing the cleaned first portion through a first supply conduit to a cooling passage within the component, and flowing a second portion of the supply of cooling air through a second supply conduit to the cooling passage, the second supply conduit being fluidly separated from the cyclone separator.

DETAILED DESCRIPTION

Figure 1:
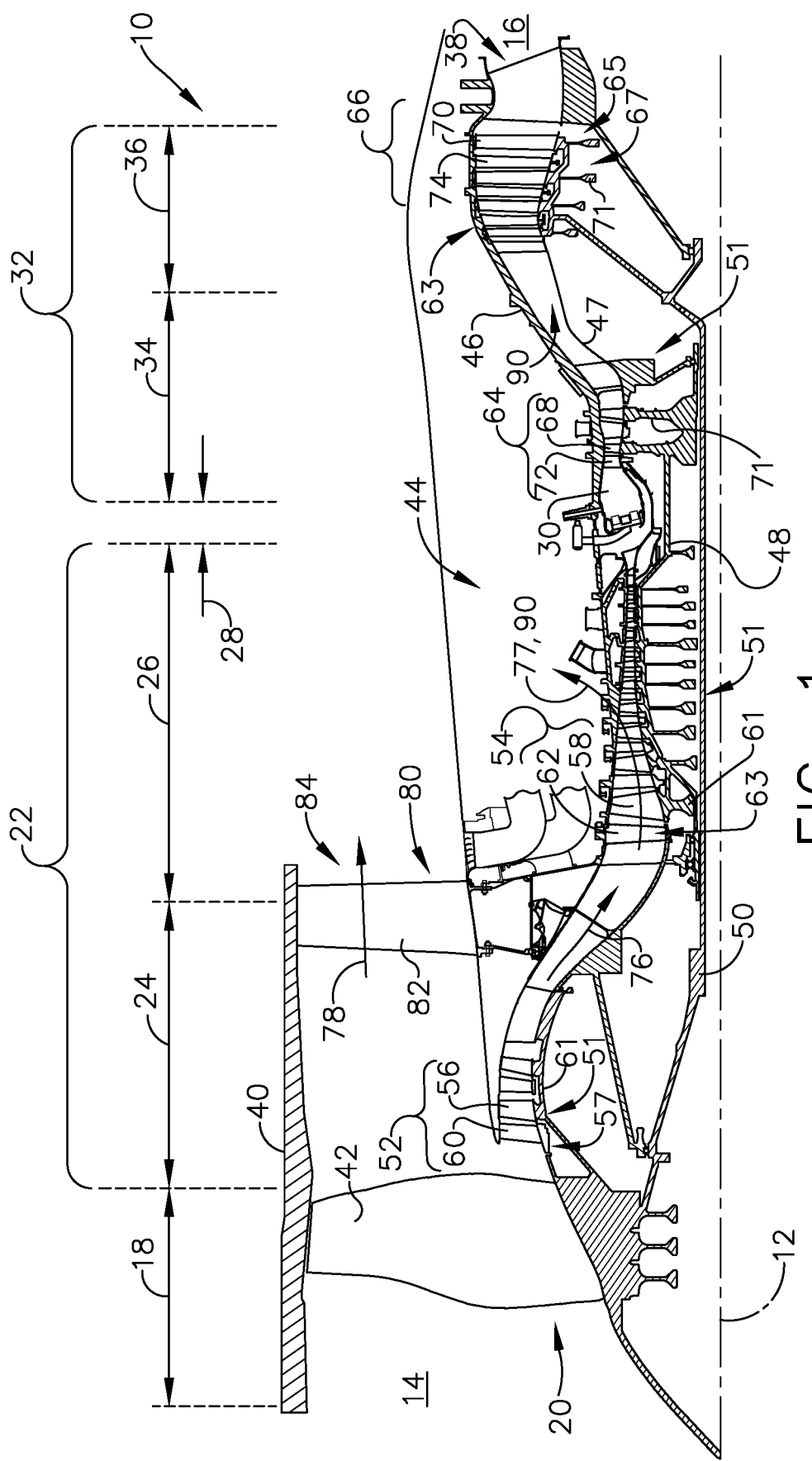
FIG. 1 is a schematic cross-sectional diagram of a turbine engine for an aircraft.

The described embodiments of the present disclosure are directed toward cooled components within a turbine engine. For purposes of illustration, the present disclosure will be described with respect to the turbine section in an aircraft turbine engine. It will be understood, however, that the disclosure is not so limited and may have general applicability within an engine, including in a compressor section, as well as in non-aircraft applications, such as other mobile applications and non-mobile industrial, commercial, and residential applications.

Cooling airflows within turbine engines can carry dust or other debris that can move into cooled components such as shrouds, hangers, airfoils, platforms, inner or outer bands, or the like. Such dust or debris can collect within the interior of cooled components or cause blockages within cooling holes or passages. The removal of such debris can improve cooling performance and provide for reduced usage of cooling air.

Turbine engines can also include components formed by additive manufacturing. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, sheet lamination, or ceramic layering or stacking.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. An annulus 95 can be defined between the core 44 and the core casing 46.

A HP shaft or spool 48 disposed coaxially about the centerline 12 of the engine 10 drivingly connects the HP turbine 34 to the HP compressor 26. ALP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54 having blade assemblies 55 and vane assemblies 57. Each blade assembly 55 includes a set of compressor blades 56, 58 that rotate relative to each vane assembly 57 having a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, having blade assemblies 65 and vane assemblies 67. Each blade assembly 65 includes a set of turbine blades 68, 70 that rotate relative to each vane assembly 67 having a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. For example, the bleed air 77 can flow along a cooling air flow path 90 passing through at least one of the engine core 44 and casing 46. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
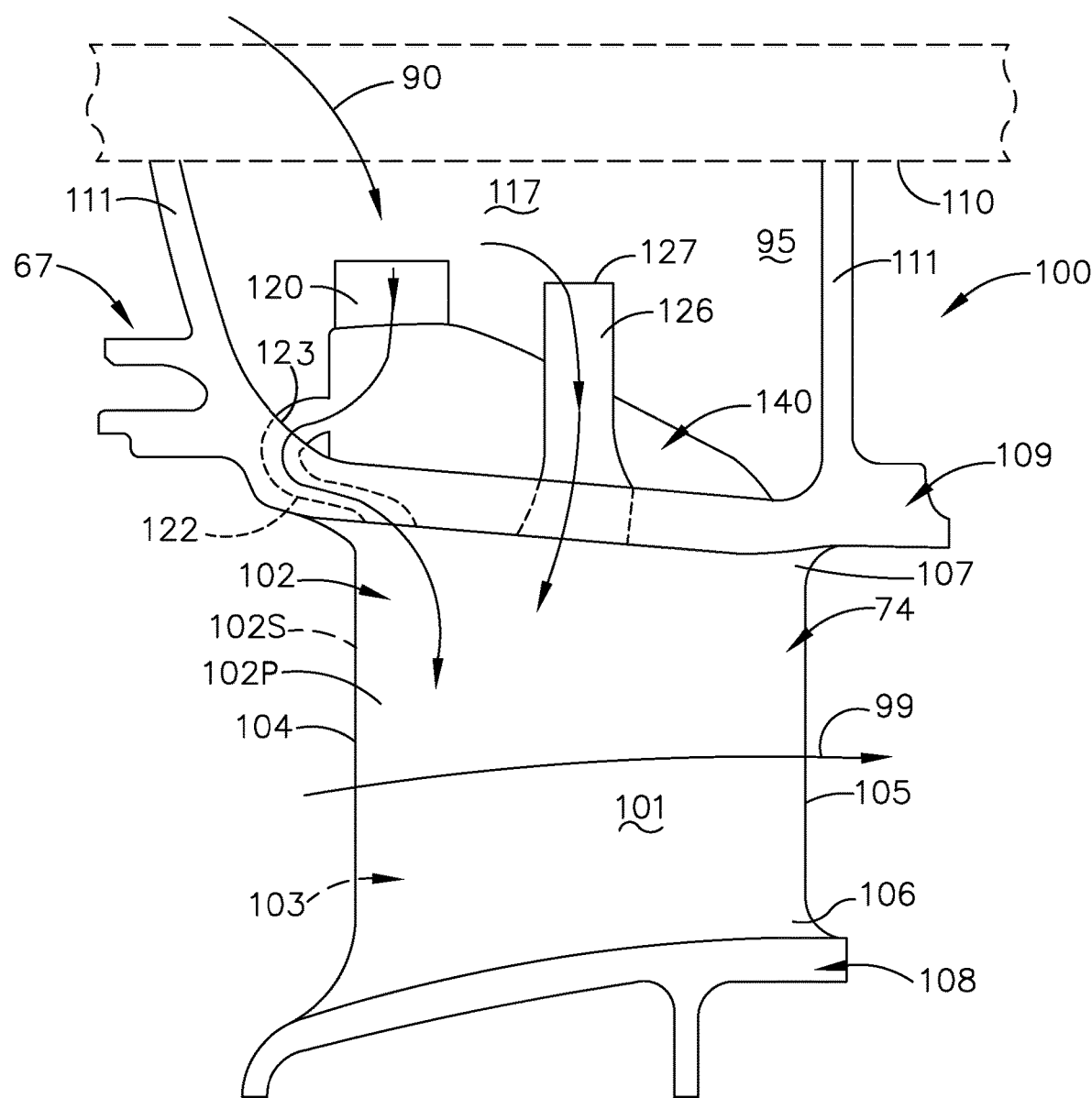
FIG. 2 is a schematic side view of one component in the turbine engine of FIG. 1 in the form of a vane assembly according to various aspects described herein.

FIG. 2 illustrates one turbine engine component 100 in the form of the vane assembly 67, such as that found in the HP turbine 34 (FIG. 1). It will be understood that aspects of the disclosure can be applied to other turbine engine components in other areas of the engine 10, including the turbine section 32 and compressor section 22, and also including the exemplary blade and vane assemblies 55, 57 or exemplary blade assemblies 65 (FIG. 1), or any airfoil assembly within the turbine engine 10.

The vane assembly 67 includes the HP turbine vane 72 (also referred to as "vane 72") and can form a nozzle in the HP turbine 34. The vane 72 can include an airfoil body 101 having an outer wall 102 bounding an interior 103 and having a pressure side 102P and a suction side 102S, extending axially between a leading edge 104 and a trailing edge 105 to define a chord-wise direction, and also extending between a root 106 and a tip 107 to define a span-wise direction as shown.

The vane 72 extends from an inner band 108 to an outer band 109, where the root 106 is coupled to the inner band 108 and the tip 107 is coupled to the outer band 109. The inner bands 108 can also couple to the core casing 46 (FIG. 1) and at least partially form the rotor 51. The body 101 of the vane 72 can confront a combustion air flow path 99 which is illustrated by an arrow indicating a combustion flow direction.

At least one cyclone separator 140 can be included in the turbine engine component 100. The cyclone separator 140 is shown as being included within the outer band 109, and it should be understood that the cyclone separator 140 can also be located within the inner band 108 or elsewhere within the component 100 as desired. In a non-limiting example where the component 100 is formed by additive manufacturing, it is contemplated that the component 100 can include a monolithic body having the vane 72, outer band 109, and cyclone separator 140. In such an example, the component 100 can be formed in a single piece with an integrated cyclone separator 140, vane 72, and outer band 109.

The core casing 46 can further include a frame 110, shown in dashed line, and a hanger 111. The component 100 can be mounted to the frame 110 via the hanger 111, such as by coupling the outer band 109 to the hanger 111. In one example, the outer band 109 can include an integrated hanger in a unitary body. In an alternate example, the outer band 109 can be mounted to a separate hanger 111. It should be understood that the core casing 46, including the frame 110 or hanger 111, can include other components not shown in FIG. 2, such as an impingement baffle, film holes, seals, or structural connections, in non-limiting examples.

The cooling air flow path 90 is illustrated through the annulus 95. In one example, the frame 110 and hanger 111 can define an interstitial space 117 that at least partially forms the cooling air flow path 90 as shown. In this manner, the vane assembly 67 can be secured or mounted within the HP turbine 34, and the annulus 95 can be at least partially defined between the outer band 109 and core casing 46.

The component 100 can include a first cooling passage 122, a fluid inlet 123, a second cooling passage 126, and a second fluid inlet 127. In the example shown, the first and second cooling passages 122, 126 extend through the outer band 109 and vane 72. The fluid inlet 123 can be in the form of a plenum, cavity, or fluid passage, and is fluidly coupled to the first cooling passage 122. The first and second cooling passages 122, 126 can each be coupled to a supply of cooling air. In one example the cooling passages 122, 126 can be fluidly coupled to the same supply of cooling air; in an alternate example, the cooling passages 122, 126 can be fluidly coupled to independent or fluidly separated supplies of cooling air. Either or both of the first and second cooling passages 122, 126 can be fluidly coupled to the annulus 95 between the core casing 46 and core 44 (FIG. 1). In the example shown, an inlet conduit 120 fluidly couples the cooling air flow path 90 and the cyclone separator 140, and the first cooling passage 122 can be fluidly coupled to the cyclone separator 140 via the fluid inlet 123. In this manner the component 100 (e.g. the vane assembly 67) can be fluidly coupled to the cooling air flow path 90.

It should be understood a plurality of components 100 can be included within the engine. For example, a plurality of vane assemblies 67 can be arranged circumferentially about the engine centerline 12 (FIG. 1), where the corresponding outer bands 109 at least partially define the annulus 95, and the corresponding fluid inlets 123 are circumferentially spaced about the annulus 95.

Figure 3:
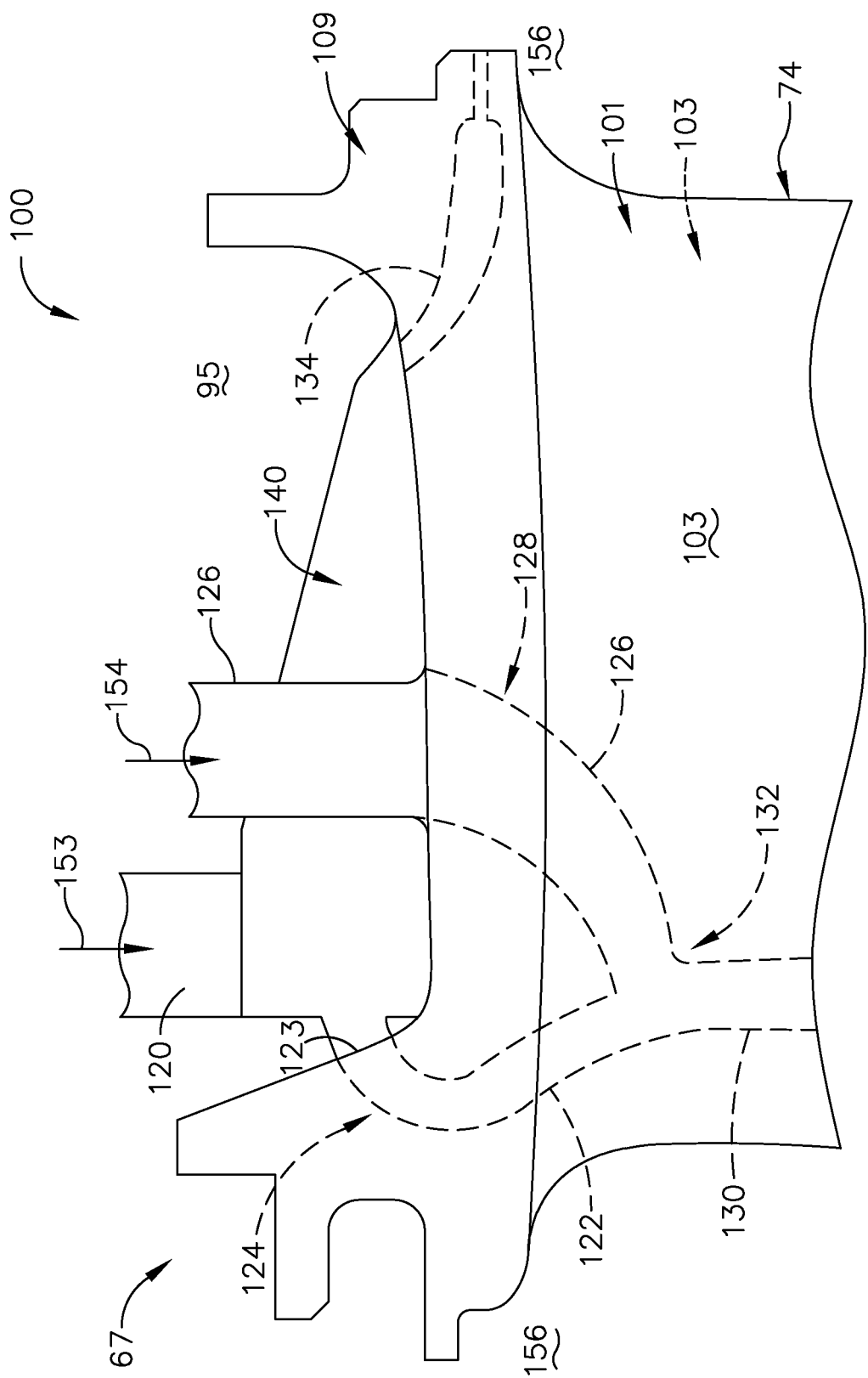
FIG. 3 is a schematic side view of the vane assembly of FIG. 2 including air cooling passages and a cyclone separator for removing particles from the cooling air.

Turning to FIG. 3, the vane assembly 67 is illustrated in further detail. The interior 103 of the vane 72 can include an interior cooling passage 130 fluidly coupled to the first and second cooling passages 122, 126. In this manner, the first and second cooling passages 122, 126 can have at least a portion supplying cooling air to the interior 103 of the body 101.

In addition, a portion 128 of the second cooling passage 126 can be fluidly separated from a portion 124 of the first cooling passage 122 within the outer band 109. The first and second cooling passages 122, 126 can also be fluidly coupled at an intersection 132. In the illustrated example, the intersection 132 is located within the interior 103 of the vane 72 downstream of the cyclone separator 140. It should be understood that the first cooling passage 122, second cooling passage 126, and intersection 132 can be located anywhere within the outer band 109 and vane 72. In addition, either or both of the cooling passages 122, 126 can furcate or branch upstream or downstream of the intersection 132. In one example (not shown), the first cooling passage 122 can have a branch fluidly coupled to a first group of cooling holes upstream of the intersection 132, while another cooling passage can fluidly couple the intersection 132 to a second group of cooling holes downstream of the intersection 132. In another example (not shown), the second cooling passage 126 can have a branch upstream of the intersection 132 that is fluidly coupled to a benign region within the airfoil. In still another example (not shown), each of the first and second cooling passages 122, 126 can include a branch upstream of the intersection 132 and fluidly coupled to respective first and second groups of cooling holes, and an additional cooling passage downstream of the intersection 132 can fluidly couple the intersection 132 to a third group of cooling holes. Such examples are given for illustrative purposes and do not limit the disclosure.

A scavenge passage 134 can be fluidly coupled to the cyclone separator 140 to direct a debris-laden airflow out of the component 100. It is contemplated that the scavenge passage 134 can be fluidly coupled to a benign region 156. As used herein, a "benign region" will refer to a region of the turbine engine 10 that is not adversely affected by the presence of dust or debris, or has a sufficient tolerance to the presence of dust or debris such that performance or efficiency of the turbine engine 10 is not reduced by an undesirable amount. For example, some regions within the engine 10 such as an upstream or downstream purge cavity can be cooled or prevented from ingesting hot combustion gas flows by the use of cooling air, even as debris may be present within the cooling air. "Benign region" can also refer to a region of the turbine engine 10 that is easily accessed or cleaned such that any accumulated dust or debris can be easily removed.

Figure 4:
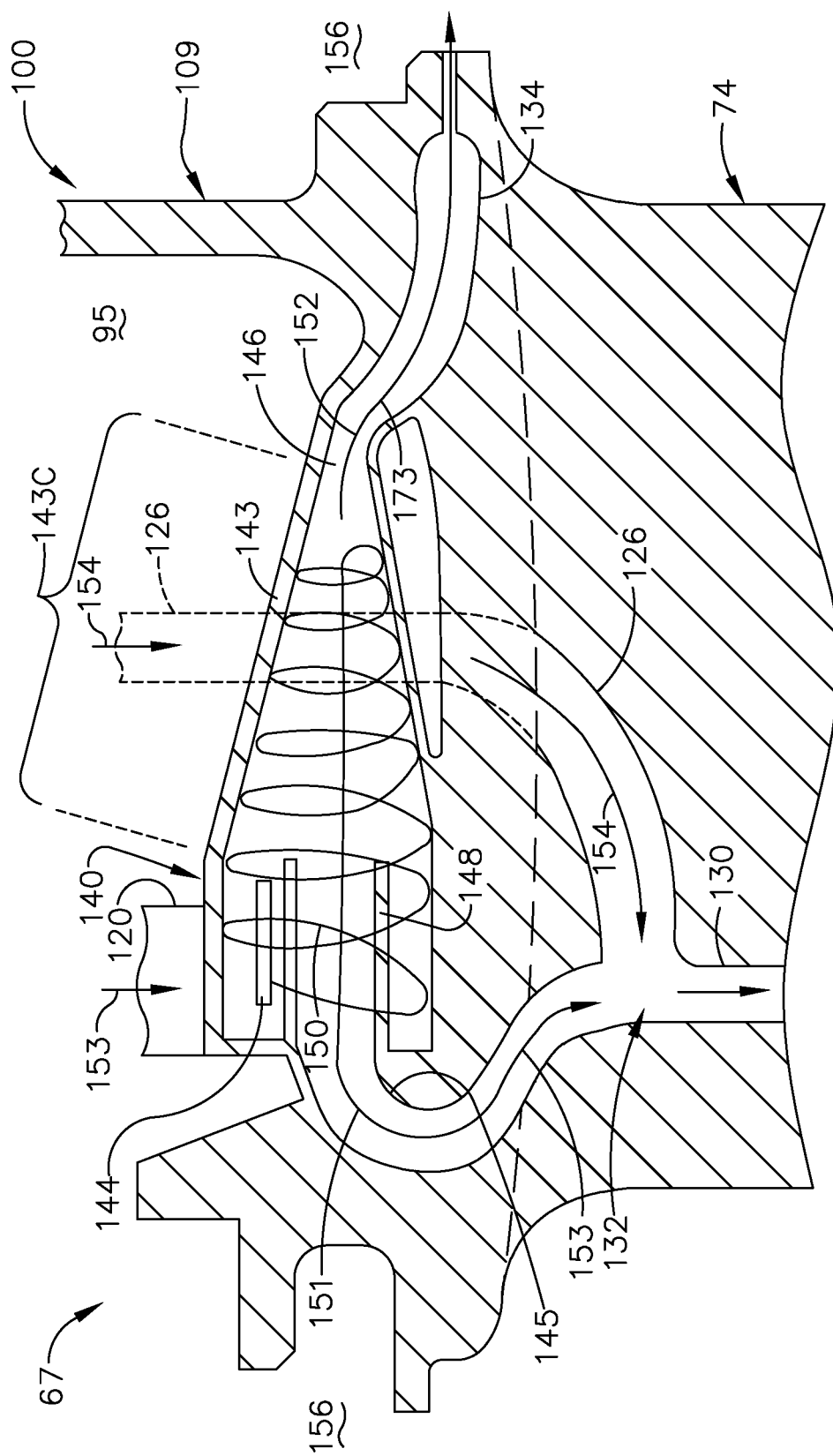
FIG. 4 is a cross-sectional view of the vane assembly of FIG. 2 illustrating the interconnection of the cooling passages and the cyclone separator.

FIG. 4 illustrates a sectional view of the vane assembly 67 and cyclone separator 140, where the second cooling passage 126 is illustrated in phantom within the outer band 109 for clarity. The cyclone separator 140 includes a separator body 143 with a tangential cooling air inlet 144, a clean air outlet 145, and a dirty air outlet 146 (also referred to as "scavenge outlet" 146). In the illustrated example the cooling air inlet 144, clean air outlet 145, and dirty air outlet 146 can be fluidly coupled to the inlet conduit 120, first cooling passage 122, and scavenge passage 134, respectively.

The cyclone separator body 143 can include a conical portion 143C adjacent the dirty air outlet 146, and an annular clean air conduit 148 can be positioned within the cyclone separator 140 adjacent the cooling air inlet 144 and clean air outlet 145. An exemplary airflow 150 from the cooling air flow path 90 (FIG. 3) is shown entering the cyclone separator 140 via the tangential cooling air inlet 144 and swirling about the clean air conduit 148. The airflow 150 is directed to the conical portion 143C and can accelerate due to the sloped sidewalls of the conical portion 143C. A first portion 151 of the airflow 150 is redirected back through the clean air conduit 148 and exits via the clean air outlet 145, while a second portion 152 of the airflow 150 exits via the dirty air outlet 146 along with dirt and debris whose momentum carries them out with the second portion 152. The second portion 152 can define a debris-laden scavenge airflow 173 exiting the cyclone separator 140. In this manner a cooling circuit 160 can extend through the component 100 and be at least partially defined by the cooling air inlet 144 and the clean air outlet 145 of the cyclone separator 140.

It should be understood that the first portion 151 of the airflow 150 exiting the clean air outlet 145 can still carry some dirt or debris, wherein the majority of dirt or debris entering the cyclone separator can exit to the scavenge passage 134. Where a "cleaned" airflow or a "cleaned" portion of an airflow or air supply is described herein, it should be understood that "cleaned" can refer to the removal of a portion less than the entirety of contaminants that may be present in the airflow or air supply. "Cleaned" as used herein can also refer to the removal of particles or contaminants larger than a predetermined size, such as the removal of particles larger than 1 micrometer from a cooling air flow in one non-limiting example.

During operation, cooling air can be supplied to the component 100. A first portion 153 (FIGS. 3, 4) of the supply of cooling air can enter the cyclone separator 140 to be cleaned as described above e.g. along the cooling air flow path 90 (FIG. 2), and the cleaned first portion 153 can flow through the first supply conduit to the interior cooling passage 130 within the vane 72. A second portion 154 (FIGS. 3, 4) of the supply of cooling air can flow through a second supply conduit, such as the second cooling passage 126, to the interior cooling passage 130. The cleaned first portion 153 and the second portion 154 of the supply of cooling air can be combined within the vane 72 at the intersection 132 to cool the vane 72 with a reduced level of contaminants in the cooling air. In one non-limiting example of operation (not shown), cleaned cooling air from the cyclone separator 140 can be supplied via the first cooling passage 122, or a branch thereof, to a group of cooling holes on the pressure side 102P (FIG. 2). Dirty cooling air from the second cooling passage 126 can be supplied to a benign region, or other dust-tolerant region, within the vane or exhausted via a set of ejection holes on the suction side 102S (FIG. 2). A mixture of cleaned air and dirty air can be formed at the intersection 132 and supplied to a third group of cooling holes, such as a set of trailing edge ejection holes. It will be understood that any or all of the cleaned first portion 153, non-cleaned second portion 154, or a mixture thereof, can be selectively supplied to any suitable region of the component 100.

Figure 5:
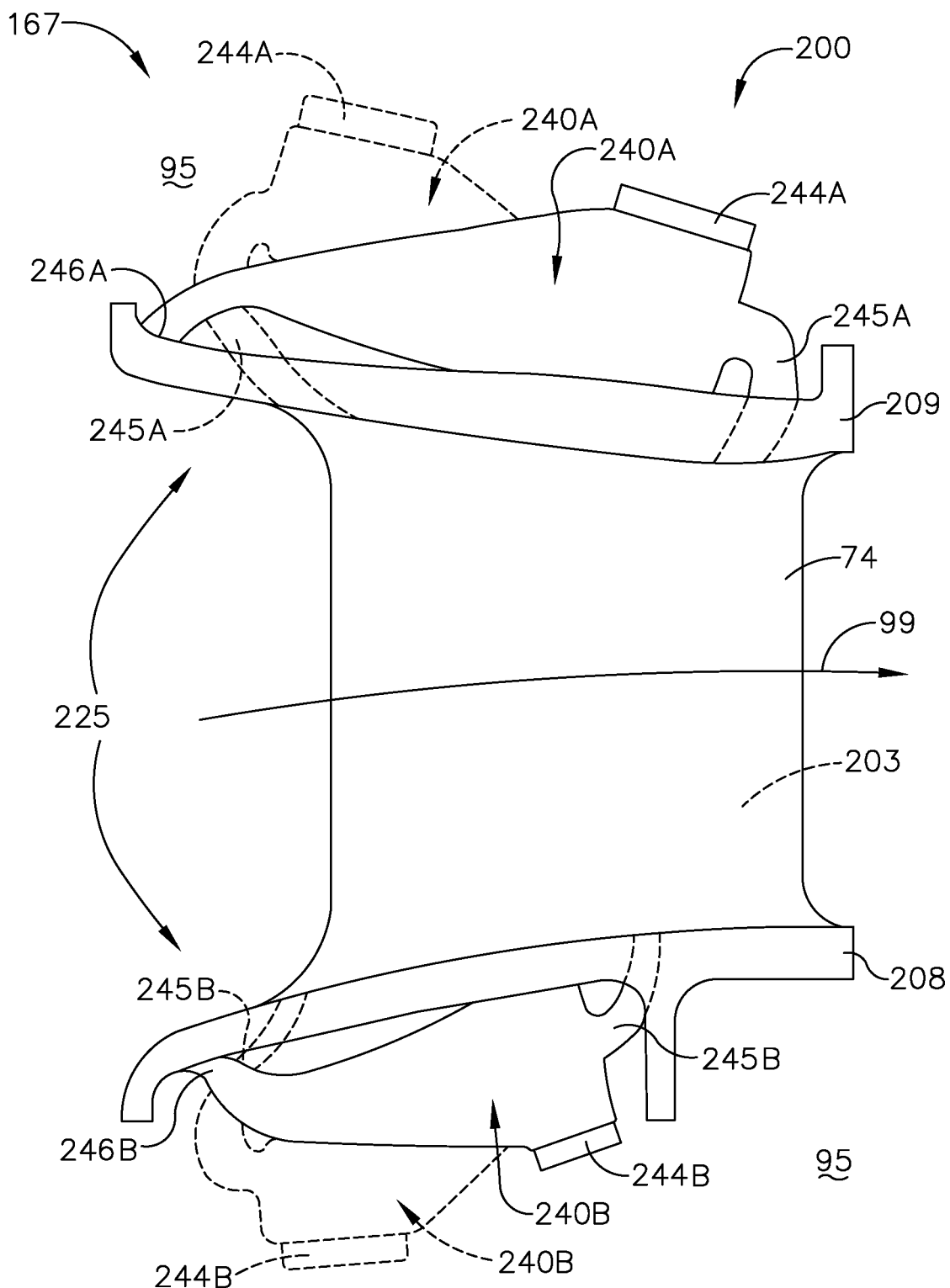
FIG. 5 is a schematic side view of another component of the turbine engine of FIG. 1 in the form of a vane assembly having at least one cyclone separator according to various aspects described herein.

Turning to FIG. 5, another component 200 is illustrated that can be utilized in the turbine engine 10. The component 200 is similar to the component 100; therefore, like parts will be described with like numerals increased by 100, with it being understood that the description of the like parts of the component 100 applies to the component 200, except where noted.

The component 200 is illustrated as a vane assembly 167 with the HP turbine vane 72 extending between an inner band 208 and an outer band 209. The combustion air flow path 99 is also shown and illustrates a local combustion flow direction. It will be understood that aspects of the disclosure can be applied to other turbine engine components in other areas of the engine 10, including the turbine section 32 and compressor section 22, and also including the exemplary blade and vane assemblies 55, 57 or exemplary blade assemblies 65 (FIG. 1).

One difference is that a set of cyclone separators can be included in, or coupled to, either or both of the inner and outer bands 208, 209. It is also contemplated that the set of cyclone separators can be arranged in groups 225 of multiple cyclone separators. The groups 225 can include any number of cyclone separators, including one, two, or more. The cyclone separators can be provided or arranged in any suitable orientation within the inner or outer bands 208, 209.

A first exemplary configuration is illustrated in solid line where the group 225 includes an outer band cyclone separator 240A and an inner band cyclone separator 240B having corresponding dirty air outlets 246A, 246B positioned upstream of corresponding clean air outlets 245A, 245B with respect to the local combustion air flow path 99. A second exemplary configuration is illustrated in dashed line, where the group 225 includes the outer and inner band cyclone separators 240A, 240B having their corresponding dirty air outlets 246A, 246B positioned downstream of their corresponding clean air outlets 245A, 245B. Each of the outer and inner band cyclone separators 240A, 240B can further include corresponding cooling air inlets 244A, 244B that can be supplied with cooling air for cleaning. In another example, both configurations can be utilized for the same component 200 wherein two outer band separators 240A and two inner band separators 240B are provided in the vane assembly 167. In still another example (not shown), multiple cyclone separators can be provided and oriented within the outer band 209 perpendicular to the combustion air flow path 99, with their clean air outlets radially inward (or radially outward) of their dirty air outlets. In this manner, at least some of the multiple cyclone separators can be radially adjacent one of the outer or inner bands. In addition, at least some of the multiple cyclone separators can be positioned between the outer band and the core casing 46.

The inner band 208 and outer band 209 can include a respective inner band cooling passage 212 and outer band cooling passage 214 supplying cooling air to the interior 203 of the vane 72. Referring to the first configuration (in solid line), the clean air outlet 245A of the outer band cyclone separator 240A can be fluidly coupled to the outer band cooling passage 214, and the clean air outlet 245B of the inner band cyclone separator 240B can be fluidly coupled to the inner band cooling passage 216.

In operation, cooling air from the annulus 95 can flow through the first and second cyclone separators 240A, 240B to define a cleaned first supply 271 of cooling air and a cleaned second supply 272 of cooling air. The cleaned first and second supplies 371, 372 can be directed into the interior 203 of the component 200, such as via the inner or outer band cooling passage 212, 214 to at least one interior cooling passage within the vane 72.

Figure 6:
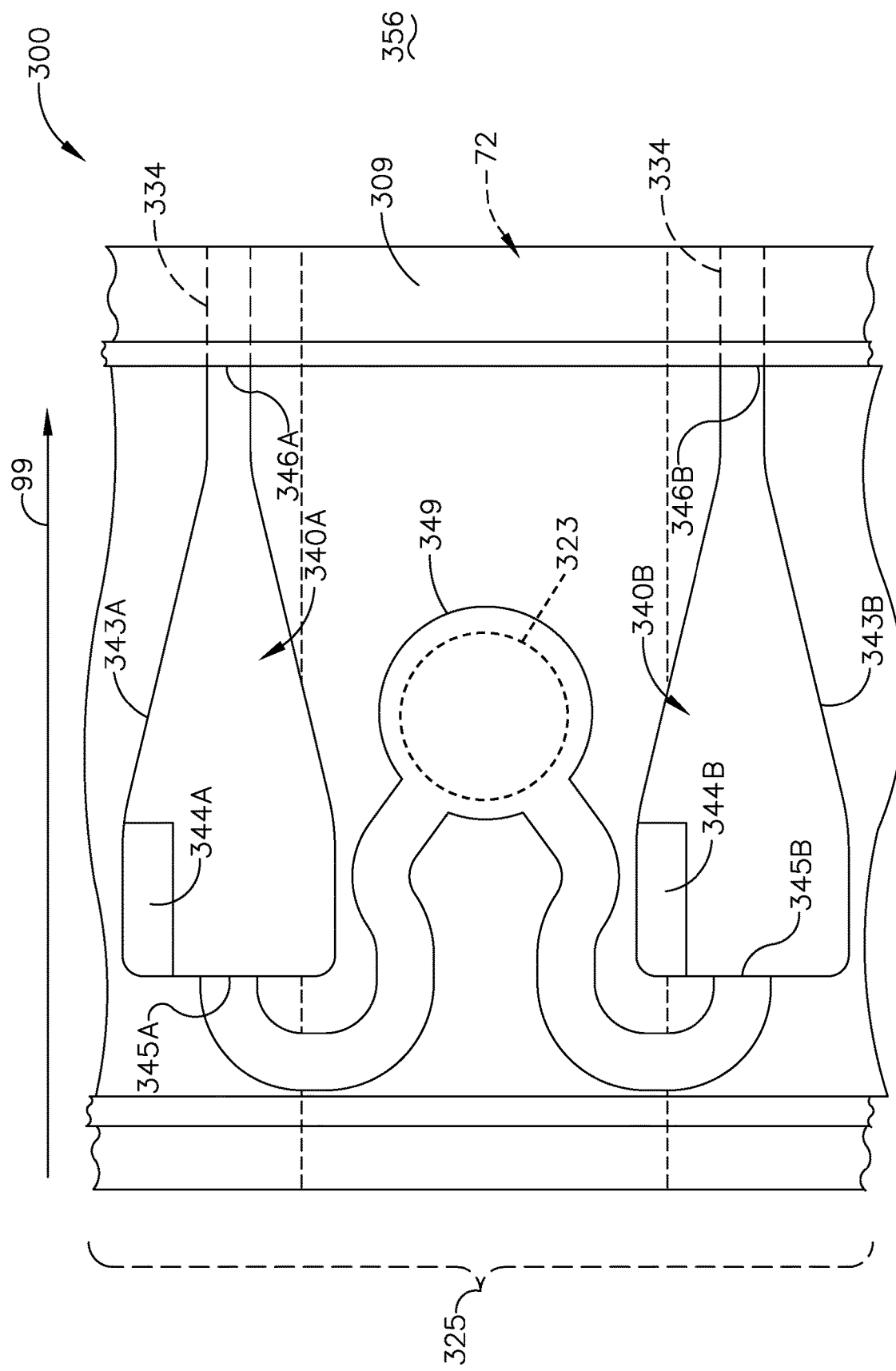
FIG. 6 is a schematic top view of another component of the turbine engine of FIG. 1 in the form of another vane assembly having a band with multiple cyclone separators.

FIG. 6 illustrates another component 300 similar to the components 100, 200. Like parts will be described with like numerals further increased by 100, with it being understood that the description of the like parts of the components 100, 200 applies to the component 300, except where noted.

The component 300 is illustrated as a vane assembly 267, similar to the vane assembly 167, with the HP turbine vane 72 extending between an inner band (not shown) and an outer band 309. The combustion air flow path 99 is also shown and illustrates a local combustion flow direction. While shown and described with respect to the outer band 309, it will be understood that aspects of the disclosure can also be applied to an inner band in a vane assembly or to a platform in a blade assembly, in non-limiting examples. In addition, the component 300 can include other components not shown, such as a baffle positioned between the outer band and core casing. In addition, it will be understood that aspects of the disclosure can be applied to other turbine engine components in other areas of the engine 10, including the turbine section 32 and compressor section 22, and also including the exemplary blade and vane assemblies 55, 57 or exemplary blade assemblies 65 (FIG. 1).

It is contemplated that a set of cyclone separators 340 can be located in the turbine engine 10 within the annulus 95, such as between the outer band 309 and the core casing 46, or radially adjacent one of the inner band or outer band 309. Each cyclone separator 340 in the set can have a cooling air inlet 244 fluidly coupled to the cooling air flow path 90 (FIG. 1), a clean air outlet 345, and a scavenge outlet or dirty air outlet 346 fluidly coupled to the cooling air flow path 90. In the illustrated example, the outer band 309 includes a first cyclone separator 340A and a second cyclone separator 340B. Each of the cyclone separators 340A, 340B have corresponding first and second cooling air inlets 344A, 344B, first and second clean air outlets 345A, 345B, and first and second dirty air outlets 346A, 346B.

The first and second cyclone separators 340A, 340B can have any desired arrangement adjacent the outer band 309. Non-limiting examples of arrangements include having each corresponding clean air outlet downstream of each corresponding dirty air outlet, or having the separator body oriented perpendicular to the local combustion air flow path 99. In this manner a cooling circuit 360 can extend through the component 300 and be at least partially defined by the cooling air inlet 344 and the clean air outlet 345 of the first cyclone separator 341.

It is also contemplated that the set of cyclone separators can include groups 325 of at least two cyclone separators. The groups 325 can include any number of cyclone separators, including two, three, four, or more. In addition, a common cooling air inlet 323 can be fluidly coupled to the at least two cyclone separators in the group 325. The common cooling air inlet 323 is schematically represented in dashed line, and can include a plenum, cavity, or fluid passage, in non-limiting examples. The common cooling air inlet 323 is similar to the fluid inlet 123 (FIG. 2) such that the common cooling air inlet 323 can be fluidly coupled to the interior of the vane 72.

In the illustrated example, a group 325 includes the first and second cyclone separators 340A, 340B provided side-by-side, circumferentially located on opposite sides of the common fluid inlet 323, and coupled to the outer band 309. The first and second clean air outlets 345A, 345B are fluidly coupled to the common fluid inlet 323 and cooling passage 349 which can extend through the outer band 309 and supply cleaned cooling air to the interior of an airfoil such as the vane 72. The first and second dirty air outlets 346A, 346B each fluidly couple to scavenge passages 334 which supply a benign region 356 such as a downstream purge cavity.

In one example, it is contemplated that the plurality of airfoils and set of cyclone separators can be circumferentially arranged such that at least one cyclone separator is positioned between circumferentially adjacent airfoils. In the example of FIG. 6, dashed lines schematically illustrate the position of circumferentially adjacent vanes 72 radially inward of, and coupled to, the outer band 309. The group 325 including the first and second cyclone separators 340A, 340B are positioned between the circumferentially adjacent vanes 72.

It should be understood that any number of cyclone separators can be positioned between circumferentially adjacent airfoils in the engine 10, including one, two, or more. The cyclone separators positioned between adjacent airfoils can be of the same group. Alternately, cyclone separators from different groups (e.g. having clean air outlets fluidly coupled to different cooling passages) can be positioned between adjacent airfoils. Any number or arrangement of cyclone separators can be utilized in the engine 10.

In operation, cooling air from the annulus 95 can flow through the first and second cyclone separators 340A, 340B to define a cleaned first supply 371 of cooling air and a cleaned second supply 372 of cooling air. The cleaned first and second supplies 371, 372 can be combined at the common cooling fluid inlet 323 and directed via the cooling passage 349 to at least one interior cooling passage within the vane 72.

Figure 7:
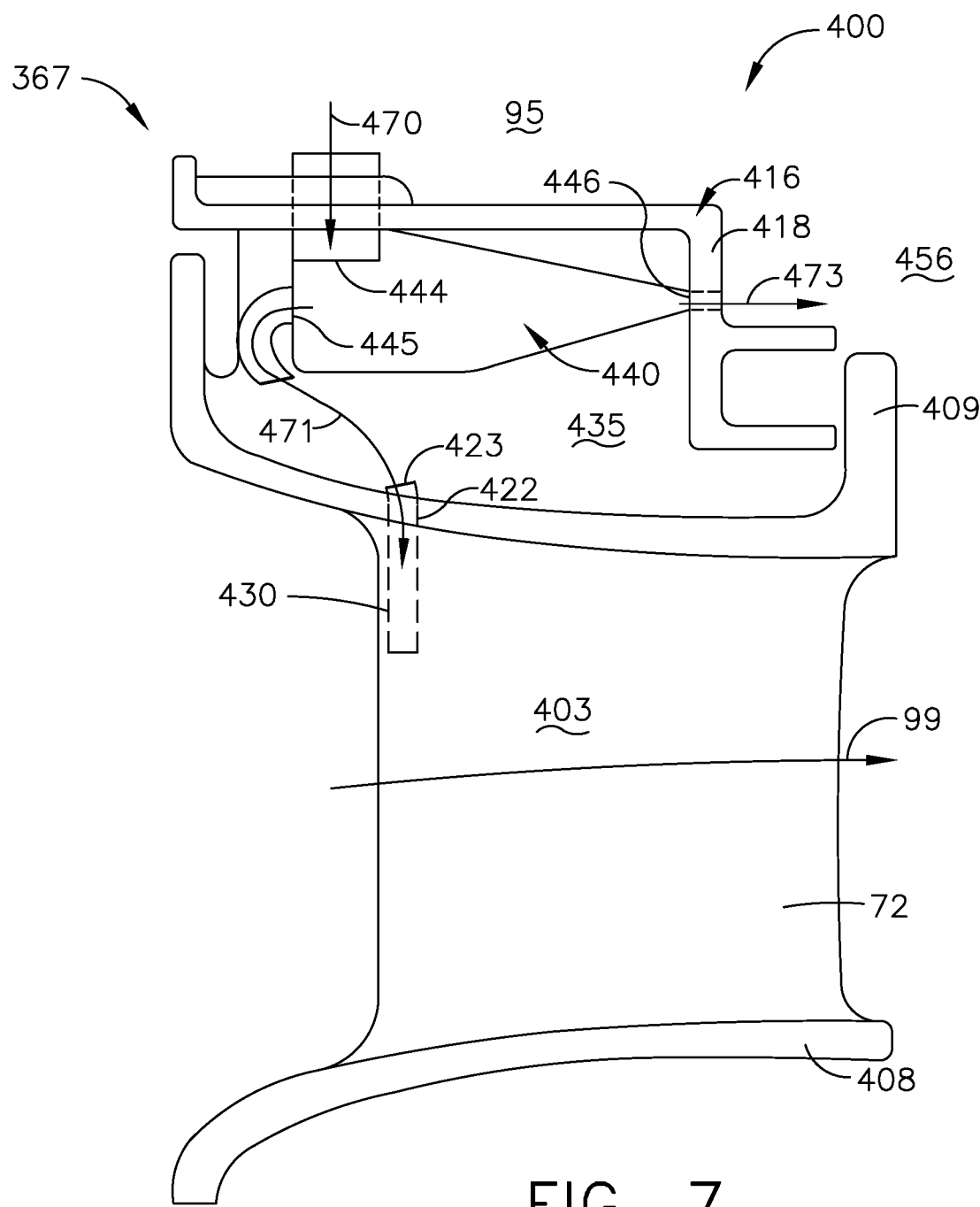
FIG. 7 is a schematic side view of another component of the turbine engine of FIG. 1 in the form of another vane assembly having a baffle with a cyclone separator.

FIG. 7 illustrates another component 400 similar to the components 100, 200, 300. Like parts will be described with like numerals further increased by 100, with it being understood that the description of the like parts of the components 100, 200, 300 applies to the component 400, except where noted.

The component 400 is illustrated as a vane assembly 367 similar to the vane assembly 67 with the vane 72 extending between an inner band 408 and an outer band 409. The combustion air flow path 99 is also shown and illustrates a local combustion flow direction. For example, the vane assembly 367 can at least partially form a stage-2 nozzle in the HP turbine 34 downstream of another vane assembly. In another non-limiting example, the vane assembly 367 can at least partially form a stage-1 nozzle upstream of all other nozzles in the HP turbine 34. In still another example, the component 400 can be located in any portion of the fan section 18, compressor section 22, or turbine section 32 as desired.

One difference is that a barrier wall 416 can be located within the cooling air flow path 90 (FIG. 1). The barrier wall 416 is shown in the form of a baffle 418 provided within or adjacent the outer band 409 to at least partially define an isolation chamber 435. It is contemplated that the isolation chamber 435 can be an annular isolation chamber.

In one example the baffle 418 can include perforations, such that the isolation chamber 435 can be partially fluidly sealed from the annulus 95 via the perforated baffle 418. Alternately, the barrier wall 416 can be configured to completely fluidly seal the isolation chamber 435, such as by extending between or directly coupling the outer band 409 and the core casing 46 (FIG. 2). In this manner, the barrier wall 416 can cooperate with at least one of the inner band 408 and outer band 409 to collectively form at least part of the isolation chamber 435.

A cooling passage 422 can extend through the outer band 409 and fluidly couple to the interior 403 of the vane 72. The cooling passage 422 can have a fluid inlet 423 within or fluidly coupled to the isolation chamber 435. In the illustrated example, the vane 72 includes an interior cooling passage 430 fluidly coupled to the cooling passage 422.

A cyclone separator 440 having a cooling air inlet 444, a clean air outlet 445, and a dirty air outlet 446 can be provided, where the clean air outlet 445 can be fluidly coupled to the isolation chamber 435. In the illustrated example, the cyclone separator 440 is mounted to the baffle 418 and located within the isolation chamber 435. An inlet conduit 420 can be fluidly coupled to the cooling air inlet 444 and extend outside of the isolation chamber 435. While one cyclone separator 440 is shown, it is contemplated that multiple cyclone separators can be located within the isolation chamber 435. In such a case, the multiple cyclone separators can be grouped to supply common fluid inlets as described above, or can each supply an independent fluid inlet as desired.

In operation, a dirty cooling airflow 470 can flow through the cyclone separator 440. A cleaned cooling airflow 471 can be defined at the clean air outlet 445, and a scavenge airflow 473 can be defined at the dirty air outlet 446. The cleaned cooling airflow 471 can move into the isolation chamber 435 and be routed to other locations or components, such as blades, vane, shroud, hangers, or interior spaces thereof, in non-limiting examples. In one example, the cleaned cooling airflow 471 can flow from the clean air outlet 445, through the isolation chamber 435, and into the interior cooling passage 430 via the fluid inlet 423. In this manner, the interior cooling passage 430 can be fluidly coupled to the clean air outlet 445 of the cyclone separator 440. In addition, the scavenge airflow 473 can flow into a benign region 456 of the turbine engine 10.

Figure 8:
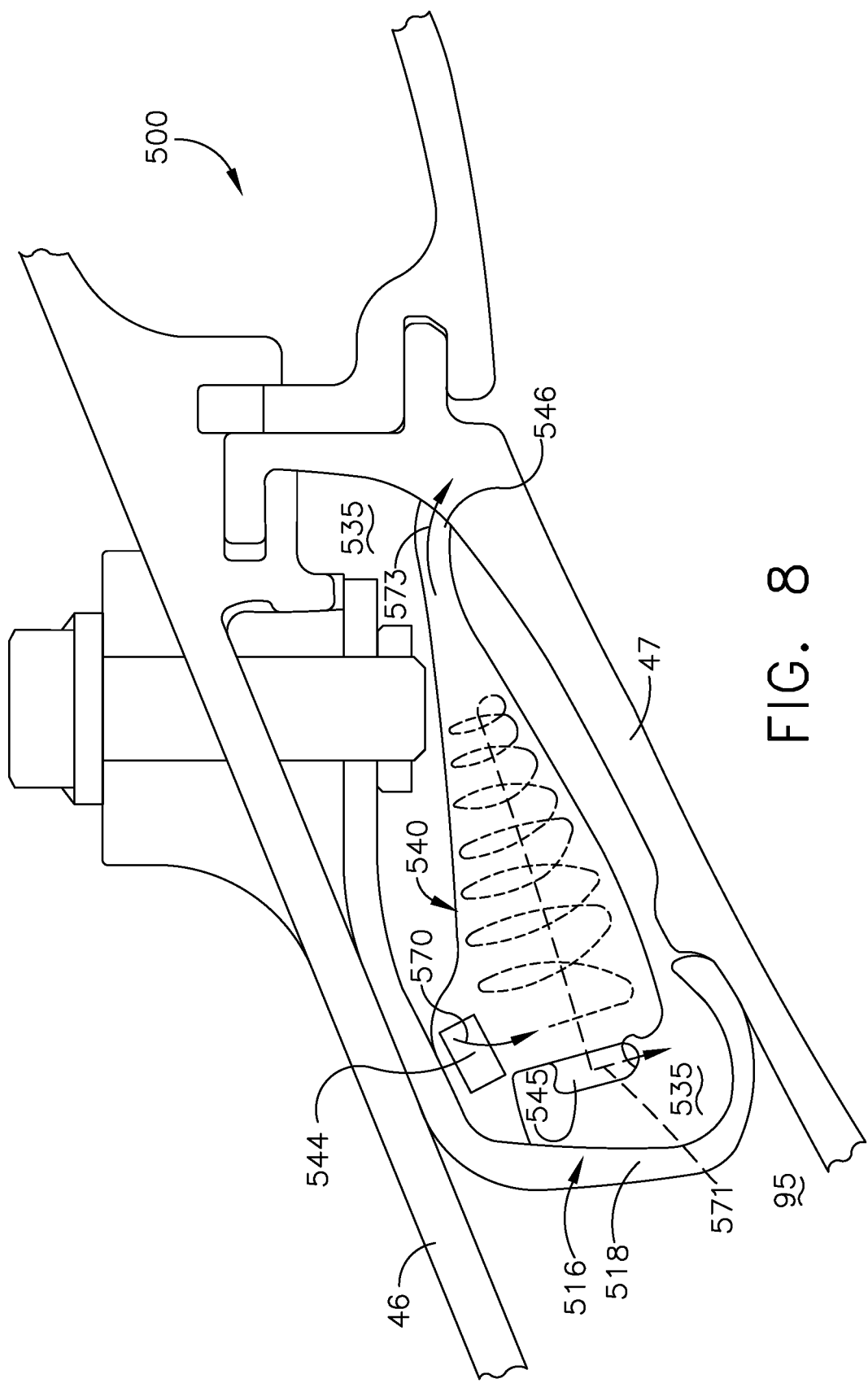
FIG. 8 is a schematic side view of another component of the turbine engine of FIG. 1 in the form of a sealing ring with a cyclone separator.

FIG. 8 illustrates another component 500 similar to the components 100, 200, 300, 400. Like parts will be described with like numerals further increased by 100, with it being understood that the description of the like parts of the components 100, 200, 300, 400 applies to the component 500, except where noted.

The component 500 is illustrated as a sealing ring 47 attached to the core casing 46. The cooling air flow path 90 (FIG. 1) can pass through the core casing 46 and core 44. A barrier wall 516 can be positioned between the core casing 46 and sealing ring 47 to at least partially form or define an isolation chamber 535 fluidly isolated from the cooling air flow path 90. The isolation chamber 535 can be an annular isolation chamber. In one example the barrier wall 516 can be in the form of a baffle 518, including a perforated baffle 518, such that the isolation chamber 535 is in partial fluid communication with the cooling air flow path 90. In another example, the barrier wall 516 can be configured to fully fluidly seal the isolation chamber 535.

A cyclone separator 540 having a cooling air inlet 544, a clean air outlet 545, and a dirty air outlet 546 can be positioned within the isolation chamber 535. The cooling air inlet 544 can be fluidly coupled to the cooling air flow path 90 (FIG. 1), and the clean air outlet 545 can be fluidly coupled to the isolation chamber 535.

In operation, a dirty cooling airflow 570 can flow through the cyclone separator 540 and define a cleaned cooling airflow 571 at the clean air outlet 545. The cleaned cooling airflow 571 can move into and be collected within the isolation chamber 535. Cleaned cooling air within the isolation chamber 535 can be routed to other locations or components within the turbine engine as described above, such as via other passages with inlets (not shown) fluidly coupled to the isolation chamber 535.

Figure 9:
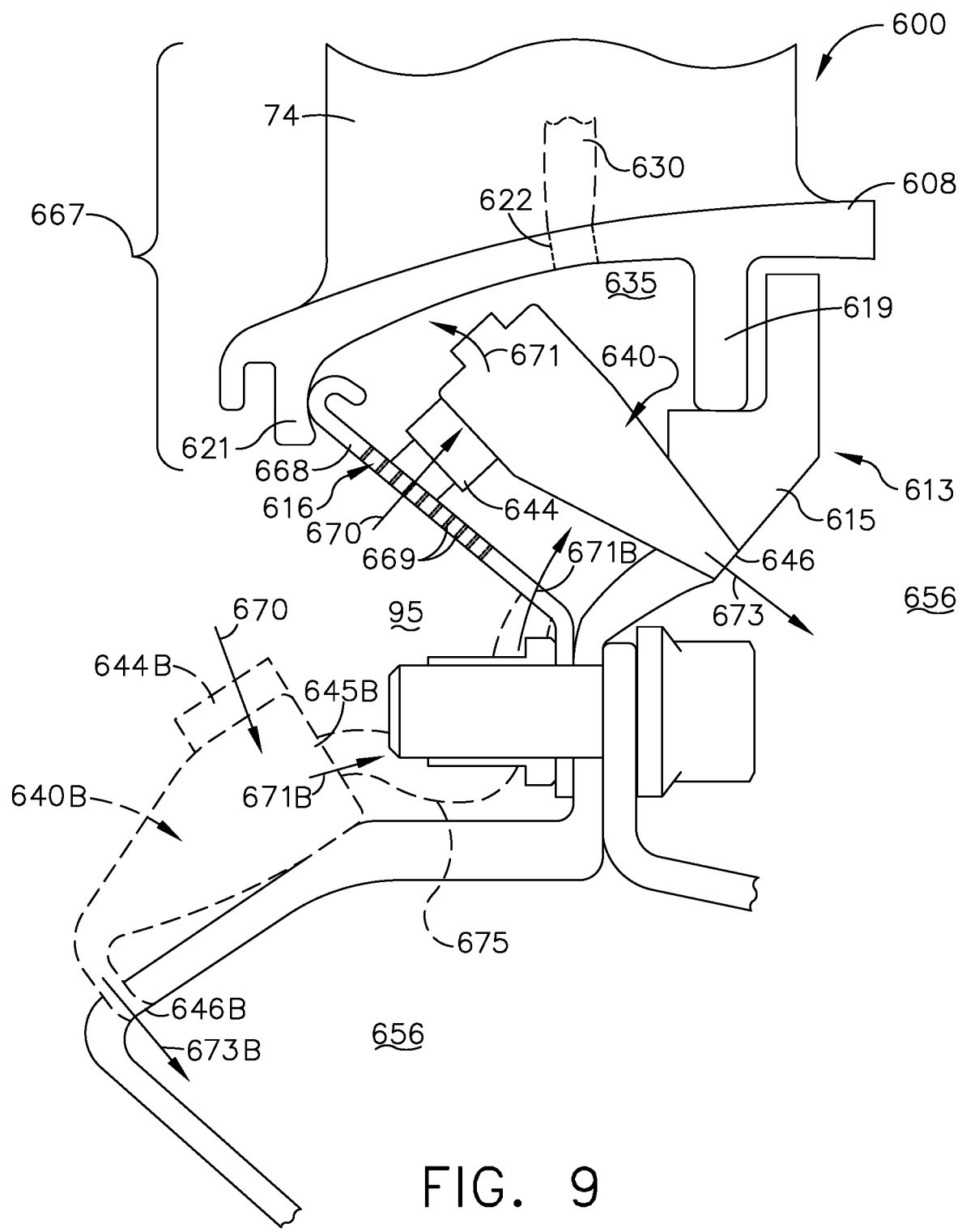
FIG. 9 is a schematic side view of another component of the turbine engine of FIG. 1 in the form of a nozzle support structure.

FIG. 9 illustrates another component 600 similar to the components 100, 200, 300, 400, 500. Like parts will be described with like numerals further increased by 100, with it being understood that the description of the like parts of the components 100, 200, 300, 400, 500 applies to the component 600, except where noted.

The component 600 is illustrated as a nozzle support 613 for a vane assembly 667 similar to the vane assembly 67 (FIG. 2) and including an LP turbine vane 74. The nozzle support 613 includes an arm 615 configured to mount a first portion 619 of the inner band 608 to the rotor 51 (FIG. 1). An isolation chamber 635 can be formed by the placement of a baffle 668 within the annulus 95 and positioned between the arm 615 and a second portion 621 of the inner band 608. In the illustrated example, the baffle 668 includes perforations 669. The isolation chamber 635 can be an annular isolation chamber, and can be at least partially fluidly isolated from the annulus 95. In one configuration shown in solid line, a cyclone separator 640 can be positioned within the isolation chamber 635. A supply of dirty cooling air 670 exterior to the isolation chamber 635 can flow through the perforated baffle 668 and enter the cooling air inlet 644 of the cyclone separator 640. Cleaned cooling air 671 can exit the clean air outlet 645 and be collected within the isolation chamber 635. The cleaned cooling air 671 can be directed from the isolation chamber 635 to other regions or components within the turbine engine 10, including the inner band 608 or vane 74 in non-limiting examples. In one example, a band cooling passage 622 can fluidly couple the isolation chamber 635 to an interior cooling passage 630 within the vane 74. In addition, a scavenge airflow 673 can exit the dirty air outlet 646 and be directed to a benign region 656 as described above.

It is further contemplated that a second cyclone separator 640B, similar to the cyclone separator 640, can be positioned on the arm 615 of the nozzle support 613, outside of the isolation chamber 635. A supply of dirty cooling air 670 can also enter the cyclone separator 640B via a cooling air inlet 644B, and a dedicated cooling passage 675 can fluidly couple the clean air outlet 645B to the isolation chamber 635. It is contemplated in either configuration that a debris-laden scavenge airflow 673, 673B can be utilized in benign regions 656 such as purge cavities that are not sensitive to the presence of dust or debris. In this manner, multiple cyclone separators can be fluidly coupled to the isolation chamber 635, wherein a dirty cooling airflow can flow through the multiple cyclone separators and their cleaned cooling airflows can be collected within a common isolation chamber.

Figure 10:
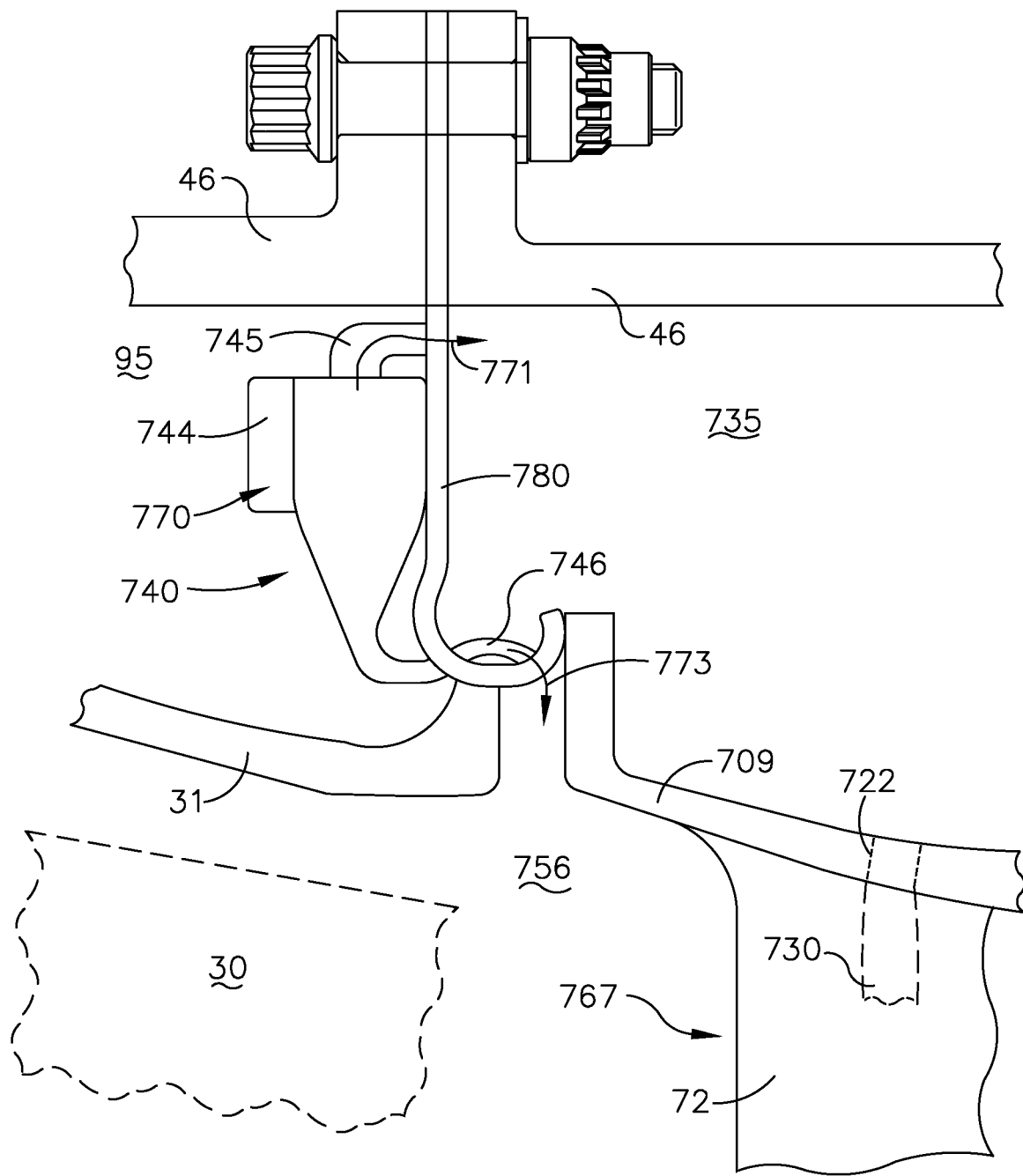
FIG. 10 is a schematic side view of another component of the turbine engine of FIG. 1 including a cyclone separator with a dedicated hanger.

FIG. 10 illustrates another component 700 similar to the components 100, 200, 300, 400, 500, 600. Like parts will be described with like numerals further increased by 100, with it being understood that the description of the like parts of the components 100, 200, 300, 400, 500, 600 applies to the component 700, except where noted.

The component 700 can be in the form of a vane assembly 767 defining a stage 1 nozzle in the HP turbine 34 (FIG. 1), wherein a vane 72 extends between an outer band 709 and an inner band (not shown). The outer band 709 can form a portion of an annular turbine casing 33 that surrounds the turbine section 32 (FIG. 1) radially inward of the core casing 46.

The combustor 30 is schematically illustrated upstream of the vane assembly 767. An annular combustor casing 31 can be positioned upstream of the vane assembly 767 and surround the combustor 30. The annulus 95 can be at least partially defined between the combustor casing 31 and turbine casing 33.

A cyclone separator 740 with cooling air inlet 744, a clean air outlet 745, and a dirty air outlet 746 can be included. One difference is that the cyclone separator 740 can be mounted to the core casing 46 on a dedicated hanger 780. The hanger 780 can be secured to at least one of the combustor casing 31 and the turbine casing 33. In addition, the hanger 780 can at least partially define an isolation chamber 735 at least partially fluidly isolated from the annulus 95. The isolation chamber 735 can be an annular isolation chamber. In the example of FIG. 10, the hanger 780 is illustrated upstream of the outer band 709; however, any suitable location within the turbine engine 10 can be utilized. In one non-limiting example, the hanger 780 and isolation chamber 735 can be positioned between the HP compressor 26 (FIG. 1) and the combustor 30 such that the combustor 30 is supplied with cleaned cooling air.

A cooling passage 722 can extend through the outer band 709 and fluidly couple to an interior cooling passage 730 within the vane 72. The cooling passage 722 can be fluidly coupled to the isolation chamber 735. During operation, a dirty cooling airflow 770 can enter the cooling air inlet 744 of the cyclone separator 740. A cleaned cooling airflow 771 can exit the clean air outlet 745 and flow into the isolation chamber 735. The cleaned cooling airflow 771 can also be directed from the isolation chamber 735 into the vane 72 via the cooling passage 722 and interior cooling passage 730. In addition, a scavenge airflow 773 can exit the dirty air outlet 746 and be directed to a benign region 756, such as a space between adjacent airfoils or shroud segments in non-limiting examples.

It should be understood that aspects of the disclosure can be mixed and matched. The below examples are given for illustrative purposes and are not intended to be limiting.

In one example, two or more cyclone separators can have their clean air outlets fluidly coupled to corresponding isolation chambers that are fluidly separated. In such a case, multiple cyclone separators can feed cleaned cooling air to separate chambers or plenums. In another example, multiple cyclone separators can be provided within a common isolation chamber, with their clean air outlets feeding the common isolation chamber. Alternately the multiple cyclone separators can have their clean air outlets fluidly coupled to a common isolation chamber, where at least some of the multiple cyclone separators are located outside of the common isolation chamber. In yet another example, each of multiple isolation chambers can be fed with cleaned cooling air from one or more cyclone separators, such as a first isolation chamber supplied with cleaned cooling air from two cyclone separators and a second isolation chamber supplied by a single cyclone separator.

In still another example, multiple chambers can be provided and fluidly coupled, and at least one cyclone separator can provide cleaned cooling air to one of the multiple chambers. In such a case, the cleaned cooling air can flow through all of the fluidly-coupled chambers, which can supply the cooling air to various portions of the turbine engine component.

Aspects of the present disclosure provide for a method of cooling a component, such as the component 100, 200, 300, 400, 500, 600, 700 in the turbine engine 10. The method includes flowing a supply of cooling air to the component. The method also includes directing a first portion, such as the first portion 153 (FIG. 4) to a cyclone separator, such as the cyclone separator 140, 240, 340, 440, 540, 640 located within the component to clean the first portion of the supply of cooling air. The method further includes flowing the cleaned first portion through a first supply conduit, such as the clean air conduit 148, to a cooling passage within the component such as the interior cooling passage 130. The method further includes flowing a second portion, such as the second portion 154, of the supply of cooling air through a second supply conduit to the interior cooling passage 130, wherein the second supply conduit is fluidly separated from the cyclone separator. Optionally, the method includes flowing a third portion of the supply of cooling air to a second cyclone separator located within the component to clean the third portion, and flowing the cleaned third portion through a third supply conduit to the interior cooling passage as described in FIGS. 5 and 6. Optionally, the method can include combining the cleaned first portion and the cleaned third portion of the supply of cooling air in the interior cooling passage as described in FIGS. 3-4. Optionally, the method can include flowing a dirty airflow from an outlet of the cyclone separator such as the dirty air outlet 146 to an exterior portion of the component such as the benign region 156 via the scavenge passage 134 as described above. Optionally, the method can include combining the cleaned first portion and the second portion of the supply of cooling air in the cooling passage within the component as described above.

Aspects additionally provide for another method of cooling a component, such as the component 100, 200, 300, 400, 500, 600, 700 in the turbine engine 10. The method can include flowing cooling air through a first cyclone separator (e.g. the first cyclone separator 240A, 340A) located within the component to define a cleaned first supply 271, 371 of cooling air, flowing cooling air through a second cyclone separator (e.g. the second cyclone separator 240B, 340B) located within the component to define a cleaned second supply 272, 372 of cooling air, and directing the cleaned first and second supplies 271, 272, 371, 372 of cooling air to at least one interior cooling passage within the component. Optionally, the method can include combining the cleaned first and second supplies 271, 272, 371, 372 of cooling air within a common conduit, such as the common fluid inlet 323, prior to the directing. Optionally, a first cyclone separator (e.g. the inner band cyclone separator 240B) can be coupled to the inner band 208 and a second cyclone separator (e.g. the outer band cyclone separator 240A) can be coupled to the outer band 209, with an airfoil (e.g. the vane 72) extending between the inner band 208 and outer band 209 as described above.

Aspects additionally provide for another method of cooling a component, such as the component 100, 200, 300, 400, 500, 600, 700 in the turbine engine 10. The method can include flowing a dirty cooling airflow via a cooling air flow path through a cyclone separator, such as the cyclone separator 140, 240, 340A, 340B, 440, 540, 640, 640B, 740, located within an isolation chamber, such as the isolation chambers 435, 535, 635, at least partially fluidly isolated from the cooling air flow path to define a cleaned cooling airflow. The method also includes collecting the cleaned cooling air within the isolation chamber via a clean air outlet of the cyclone separator. The method can also include flowing the cleaned cooling airflow from the isolation chamber to an interior of the component, such as the component 400 (FIG. 7). Optionally, the collecting can further include collecting the cleaned cooling airflow within the isolation chamber at least partially defined by a baffle, which can include a perforated baffle such as that shown in FIG. 9. Optionally, the method can further include flowing the dirty cooling airflow through multiple cyclone separators each fluidly coupled to the isolation chamber via corresponding clean air outlets, such as that shown in FIG. 9.

Aspects of the present disclosure provide for a variety of benefits, including an increase in component lifetime in engines that operate in high dust environments. It can be appreciated that the use of cyclonic separators on individual turbine engine components can provide for cleaned cooling air without need of additional upstream separators or other debris removal components. Such removal of debris can improve cooling performance of the cooling air in and around the turbine engine components. In addition, cooling air can be selectively cleaned for individual components e.g. providing multiple cyclone separators for a single component which may be more sensitive to the presence of dust, and providing a single cyclone separator for a more dust-tolerant turbine engine component. Improved cooling performance can provide for less cooling air supplied to the cooled components, improving engine efficiency during operation.

It can also be appreciated that grouping multiple cyclone separators to supply common cooling air inlets can provide for simplified ducting within the engine, which lowers costs and improves process efficiencies, as well as providing for improved cooling for the engine component from the multiple cyclone separators.

In addition, the use of an isolation chamber to at least partially contain cleaned cooling air from the cyclone separators can provide for simplified cooling structures, wherein multiple components can be fluidly supplied to a common isolation chamber to receive the cleaned cooling air. Such simplification can reduce costs and improve manufacturing efficiencies, as well as reducing an overall weight of the engine which improves engine efficiency.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine comprising:
    a body having an outer surface confronting a combustion air flow path and defining an interior;
    a first cooling passage having at least a portion supplying cooling air to the interior of the body;
    a second cooling passage having at least a portion supplying cooling air to the interior of the body and fluidly separated from the first cooling passage;
    a scavenge passage fluidly separated from the second cooling passage;
    a first cyclone separator having a cooling air inlet, a clean air outlet fluidly coupled to the first cooling passage, and a dirty air outlet fluidly coupled to the scavenge passage; and
    a second cyclone separator having a clean air outlet fluidly coupled to the interior of the body;
    wherein the clean air outlet of the second cyclone separator is fluidly coupled to the clean air outlet of the first cyclone separator.

2. The component of claim 1 wherein the scavenge passage supplies dirty cooling air to a benign region of the turbine engine.

3. The component of claim 1 wherein the body further comprises a monolithic body having the outer surface, the first cooling passage, the second cooling passage, the scavenge passage, and the first cyclone separator.

4. The component of claim 1 further comprising an intersection fluidly coupling the first cooling passage and the second cooling passage.

5. The component of claim 4 wherein the intersection is positioned downstream of the first cyclone separator.

6. The component of claim 4 wherein the intersection is within the interior of the body.

7. The component of claim 6 further comprising an interior cooling passage within the body fluidly coupled to the first and second cooling passages via the intersection.

8. The component of claim 1 further comprising one of a nozzle support, a platform, an inner band, an outer band, a shroud, or a sealing ring.

9. The component of claim 1 further comprising a cooling circuit extending through the component and at least partially defined by the cooling air inlet and the clean air outlet of the first cyclone separator.

10. The component of claim 1 wherein the dirty air outlet of the first cyclone separator is fluidly separated from the interior of the body.

11. A component for a turbine engine, comprising:
- a vane with an outer wall bounding an interior and extending axially between a leading edge and a trailing edge to define a chord-wise direction, and also extending between a root and a tip to define a span-wise direction, the vane also extending from an inner band at the root to an outer band at the tip;
- a first cooling passage having at least a portion supplying cooling air to the interior of the vane;
- a second cooling passage having at least a portion supplying cooling air to the interior of the vane and fluidly separated from the first cooling passage;
- a scavenge passage; and
- a first cyclone separator located within one of the inner band or the outer band and having a cooling air inlet, a clean air outlet fluidly coupled to the second cooling passage, and a dirty air outlet fluidly coupled to the scavenge passage.

12. The component of claim 11 further comprising a second cyclone separator located within the other of the inner band or the outer band and having a second clean air outlet fluidly coupled to the interior of the vane.

13. A method of cooling a component in a turbine engine, the method comprising:
- flowing a supply of cooling air to the component;
- directing a first portion of the supply of cooling air to a cyclone separator located within the component to clean the first portion of the supply of cooling air;
- flowing the cleaned first portion through a first supply conduit to a cooling passage within the component; and
- flowing a second portion of the supply of cooling air through a second supply conduit to the cooling passage, the second supply conduit being fluidly separated from the cyclone separator; and
- combining the cleaned first portion and the second portion of the supply of cooling air in the cooling passage within the component.

14. The method of claim 13 further comprising flowing a third portion of the supply of cooling air to a second cyclone separator located within the component to clean the third portion, and flowing the cleaned third portion through a third supply conduit to the cooling passage.

15. The method of claim 14 further comprising combining the cleaned first portion and the cleaned third portion of the supply of cooling air in the cooling passage within the component.

16. The method of claim 13 further comprising flowing a dirty airflow from an outlet of the cyclone separator to an exterior portion of the component via a scavenge passage.

* * * * *